(12) United States Patent
Suzuki

(10) Patent No.: US 9,469,133 B2
(45) Date of Patent: Oct. 18, 2016

(54) RECORDING APPARATUS AND ASSEMBLY METHOD

(71) Applicant: OKI DATA INFOTECH CORPORATION, Chiba-shi, Chiba (JP)

(72) Inventor: Kenji Suzuki, Chiba (JP)

(73) Assignee: OKI Data Infotech Corporation, Chiba-shi, Chiba (JP)

( * ) Notice: Subject to any disclaimer, the term of this patent is extended or adjusted under 35 U.S.C. 154(b) by 0 days.

(21) Appl. No.: 14/773,604

(22) PCT Filed: Jan. 9, 2014

(86) PCT No.: PCT/JP2014/050195
§ 371 (c)(1),
(2) Date: Sep. 8, 2015

(87) PCT Pub. No.: WO2014/181553
PCT Pub. Date: Nov. 13, 2014

(65) Prior Publication Data
US 2016/0059597 A1    Mar. 3, 2016

(30) Foreign Application Priority Data

May 10, 2013  (JP) .................................. 2013-100402
Dec. 13, 2013  (JP) .................................. 2013-258395

(51) Int. Cl.
*B41J 29/02*    (2006.01)
*A01B 1/02*    (2006.01)
*B41J 29/13*    (2006.01)

(52) U.S. Cl.
CPC ................ *B41J 29/02* (2013.01); *A01B 1/026* (2013.01); *B41J 29/13* (2013.01)

(58) Field of Classification Search
CPC ........ B41J 29/13; B41J 29/02; B41J 2/1752; B41J 2/17513; B41J 29/38; A01B 1/026

USPC .......................................................... 347/108
See application file for complete search history.

(56) References Cited

U.S. PATENT DOCUMENTS

2007/0051762 A1* 3/2007 Porter ....................... A45F 3/02
                                                              224/259
2008/0112115 A1* 5/2008 Yang .................... B65D 5/5069
                                                            361/679.07

(Continued)

FOREIGN PATENT DOCUMENTS

JP        2004082615         3/2004

OTHER PUBLICATIONS

International Search Report mailed Apr. 8, 2014, issued in International Application No. PCT/JP2014/050195.

*Primary Examiner* — Manish S Shah
*Assistant Examiner* — Yaovi M Ameh
(74) *Attorney, Agent, or Firm* — Muncy, Geissler, Olds & Lowe, P.C.

(57) ABSTRACT

Provided is a recording apparatus with an enhanced handling property, including a grip preventing a risk in that the recording apparatus may slip out of fingers. Accordingly, the grip is arranged on a back surface of the recording apparatus. A plurality of slits are formed in a metal plate on a back surface side of a main body. The grip is inserted into the slits, and both end portions of the grip are fixed. A center portion of a belt protrudes outward to function as the grip to be grasped by a user. The slits are each formed along a vertical direction, and a widthwise direction of the belt is defined as the vertical direction. Further, the slits regulate the belt, and hence the belt is not twisted even when the user grasps the belt, which provides structure facilitating transmission of a force. The user raises the laid recording apparatus while grasping the grip, thereby being capable of easily setting the recording apparatus in an upright position.

7 Claims, 8 Drawing Sheets

(56) References Cited

U.S. PATENT DOCUMENTS

2009/0245912 A1* 10/2009 Igarashi ................ B41J 11/003
  400/618
2010/0125027 A1* 5/2010 Abiemo ............. A63B 23/0211
  482/8
2013/0264457 A1* 10/2013 Ueyama ................. F16M 13/02
  248/674

* cited by examiner

RECORDING APPARATUS AND ASSEMBLY METHOD

TECHNICAL FIELD

The present invention relates to a recording apparatus for recording an image on a recording medium, and to a method of assembling the recording apparatus.

BACKGROUND ART

Hitherto, there has been widely known an image recording apparatus for recording, on a recording medium, image data received from a host computer. The image recording apparatus is typified by, for example, an ink jet printer. The ink jet printer is used in various fields such as home use and office use.

Further, the inkjet printer can perform recording by discharging ink on a variety of recording media such as paper and a plastic film. Accordingly, the ink jet printer may be used to perform recording on a billboard or the like to be placed outdoors. When an object to be recorded is placed outdoors, solvent-based ink is used in order to prevent colors from being faded and lost due to sunlight, wind, and rain. For example, recording is performed on a polyvinyl chloride film or the like as the recording medium. Further, in order to perform recording on the above-mentioned objects to be recorded, a large-size ink jet printer having a width of 1 m or more is used. The large-size ink jet printer has a weight of several hundred kilograms, and includes a main body section for performing recording on the recording medium, and a leg section for supporting the main body section.

Accordingly, the large-size ink jet printer may include a grip to be used when taking the ink jet printer out of a package to assemble the ink jet printer, or when raising the ink jet printer.

For example, JP 2004-82615 A discloses a printer including grips arranged on a main body thereof. The printer can be raised by putting fingers on the grip portions.

CITATION LIST

Patent Literature

[PTL 1] JP 2004-82615 A

SUMMARY OF INVENTION

Technical Problem

In the related art, the grip portion is formed of a recess formed in a lower portion of a casing or the like. Accordingly, the grip portion merely has such a shape that fingers may be put thereon. The grip cannot be grasped with hands.

For example, as in the related art, when the printer is not extremely heavy and can therefore be raised by putting fingers on the grip, the grip does not need to be grasped securely. However, there is still a risk in that, when raising the printer, the printer may slip out of the fingers to fall.

In addition, when the printer is heavy, it is difficult to support the printer with fingers. Further, the risk in that the printer may slip out of the fingers is further increased, which involves danger.

For example, when the grip only allows fingers to be put thereon and the printer is tilted in a direction of inserting the fingers, the printer easily slips out of the fingers. Accordingly, an assistant is further needed in order to prevent the printer from being tilted.

Solution to Problem

The present invention provides a recording apparatus with an enhanced handling property, including a grip preventing a risk in that the recording apparatus may slip out of fingers.

According to one embodiment of the present invention, there is provided a recording apparatus, including: a main body section including recording means for recording an image on a recording medium; a leg section removably mounted to a lower portion of the main body section to support the main body section; a plurality of slits formed in a back surface of the main body section; and a grip mounted to the back surface of the main body section and inserted into the plurality of slits, the grip having a height that is variable in a direction perpendicular to the back surface.

Further, according to one embodiment of the present invention, there is provided a method of assembling a recording apparatus, the recording apparatus including: a main body section including recording means for recording an image on a recording medium; a leg section removably mounted to a lower portion of the main body section to support the main body section; a plurality of slits arranged in a back surface of the main body section; and a grip inserted into the plurality of slits, the leg section including a caster to be brought into contact with an installation surface when the recording apparatus is set upright, and a stopper arranged on an outer periphery of the caster, the leg section being separated from the main body section under a state in which the recording apparatus is packed in a packing box, the back surface of the main body section being partially placed and fixed to a table placed on a bottom surface of the packing box, the method including the steps of, when assembling the recording apparatus: fixing the leg section to the main body section at a position at which the leg section is kept out of contact with the installation surface; raising the main body section while an operator holds the grip to bring the stopper into abutment on the installation surface; and further raising the main body section about a fulcrum corresponding to the stopper held in abutment on the installation surface to set the recording apparatus upright.

Advantageous Effects of Invention

According to the one embodiment of the present invention, the grip having an enhanced gripping property is provided. Thus, it is possible to prevent the risk in that the recording apparatus may slip out of fingers, and to enhance the handling property of the recording apparatus.

DESCRIPTION OF EMBODIMENTS

An embodiment of the present invention is described with reference to the drawings.

Figure 1:
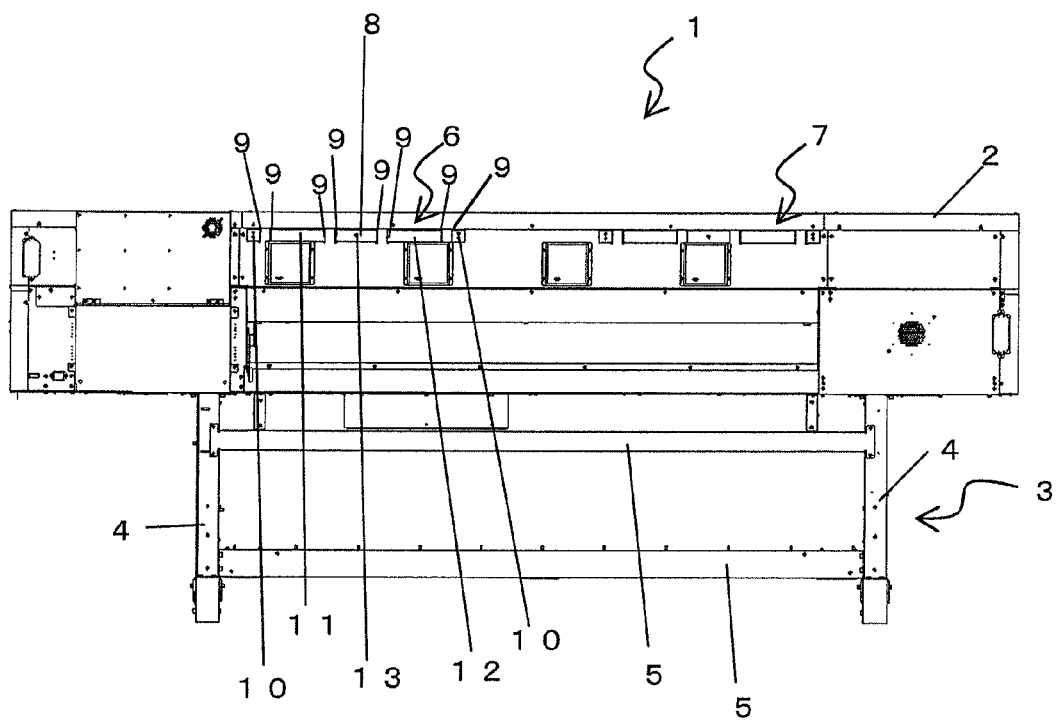
FIG. 1 is a view for illustrating a back surface side of a recording apparatus.

FIG. 1 is a view for illustrating a back surface side of an ink jet printer 1. The ink jet printer 1 includes a main body section 2 and a leg section 3.

The main body section 2 includes recording means including an ink jet head for recording an image on a recording medium such as paper or a plastic film. The leg section 3 supports the main body section 2 at two positions on the right and left. The leg section 3 includes two upright portions 4 and beam portions 5 for connecting the upright portions 4 to each other.

A grip 6 and a grip 7 are arranged at left and right positions of an upper part of a back surface of the main body section 2, respectively. The grips 6, 7 are fixed to a metal plate. The grip 6 is formed of a belt 8 fixed to the main body 2. Eight slits 9 are formed in the main body section 2, and each end of the belt 8 is fixed to the main body section 2 with a screw 10. The belt 8, which is fixed with the screw 10 on the left side of the drawing sheet, is inserted into the main body section 2 from the leftmost slit 9, and is pulled out through the adjacent slit 9. The insertion and pulling-out are repeated alternately, and the belt 8 is pulled out through the rightmost slit 9. Finally, the belt 9 is fixed at a right end thereof to the main body section 2 with the screw 10. A length of the belt 8 is larger than a distance between the screws 10 for fixing the belt 8. The belt 8 may protrude outward at a first gripping portion 11 and a second gripping portion 12. Further, the belt 8 is fixed at a center portion thereof to the main body section 2 with a screw 13. When the belt 8 is used as the grip, the first gripping portion 11 and the second gripping portion 12 are pulled out of the main body section 2. Alternatively, when the belt 8 is not used as the grip, the belt 8 may be pushed into and accommodated in the main body section 2. The grip 7 is also constructed similarly to the grip 6. The first gripping portion 11 and the second gripping portion 12 are arranged on both sides of the belt 8. Accordingly, when one person supports each side of the main body section 2, that is, two persons support the main body section 2 in total, each person can firmly grasp the first gripping portion 11 and the second gripping portion 12 of the grip with both hands. Thus, it is possible to prevent such an accident that the ink jet printer slips out of fingers.

The belt 8 may be formed of a flat belt such as a woven belt or a leather belt. Further, an end portion of the belt 8 is fixed, with fixing means such as a screw, to the metal plate formed on the back surface of the main body section 2.

Figure 2:
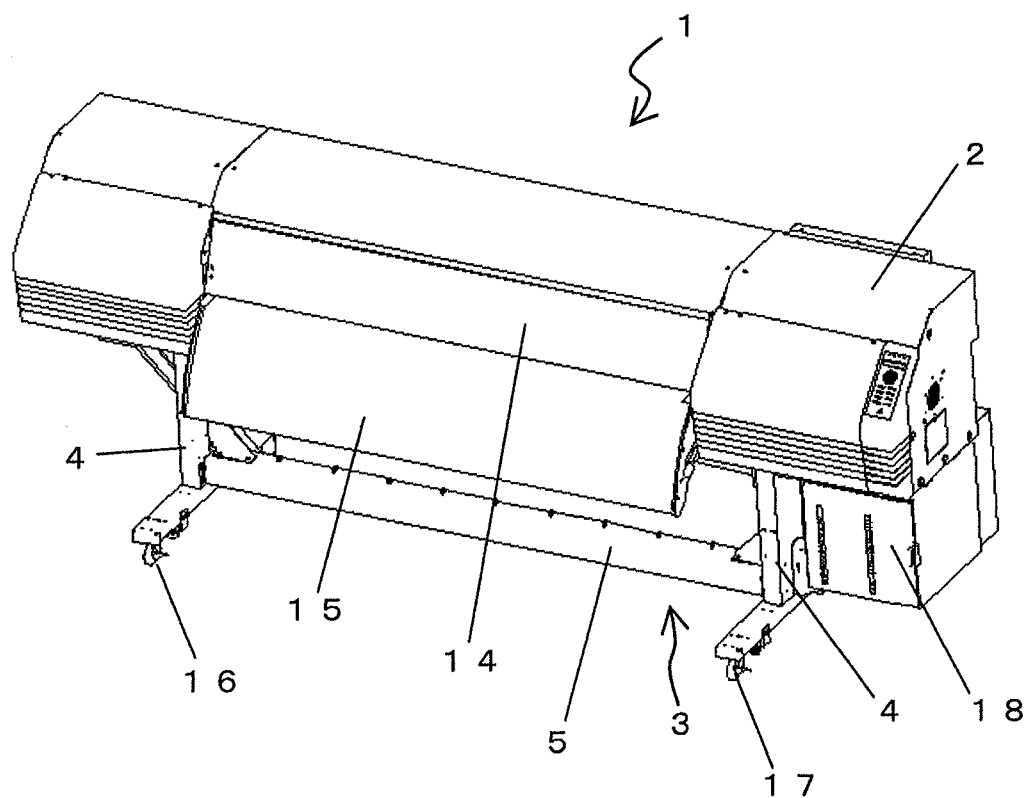
FIG. 2 is a schematic view for illustrating an entire configuration of the recording apparatus.

FIG. 2 is a schematic view for illustrating an entire configuration of a recording apparatus. FIG. 2 is a view as seen from an obliquely upper side of a front of the recording apparatus. Below the upright portions 4, there are formed portions extending in a direction perpendicular to a longitudinal direction of the ink jet printer 1, thereby enabling the recording apparatus to stand stably. A caster 16 or a caster 17 is arranged at an end portion of each of the upright portions 4. The main body section 2 includes a cover 14. A platen, conveying means for the recording medium, and the recording means, such as a carriage on which the ink jet head is mounted, are accommodated behind the cover 14. A paper guide 15 guides the recording medium subjected to recording, and a built-in heater heats the recording medium to accelerate drying and fixing of ink. A cartridge accommodating portion 18 accommodates an ink cartridge containing ink to be supplied to the ink jet head. The ink is supplied from the ink cartridge to the ink jet head through a tube. The carriage scans, in a reciprocating manner, the recording medium conveyed to the platen by the conveying means, and the ink jet head discharges ink, thereby recording the image.

Figure 3:
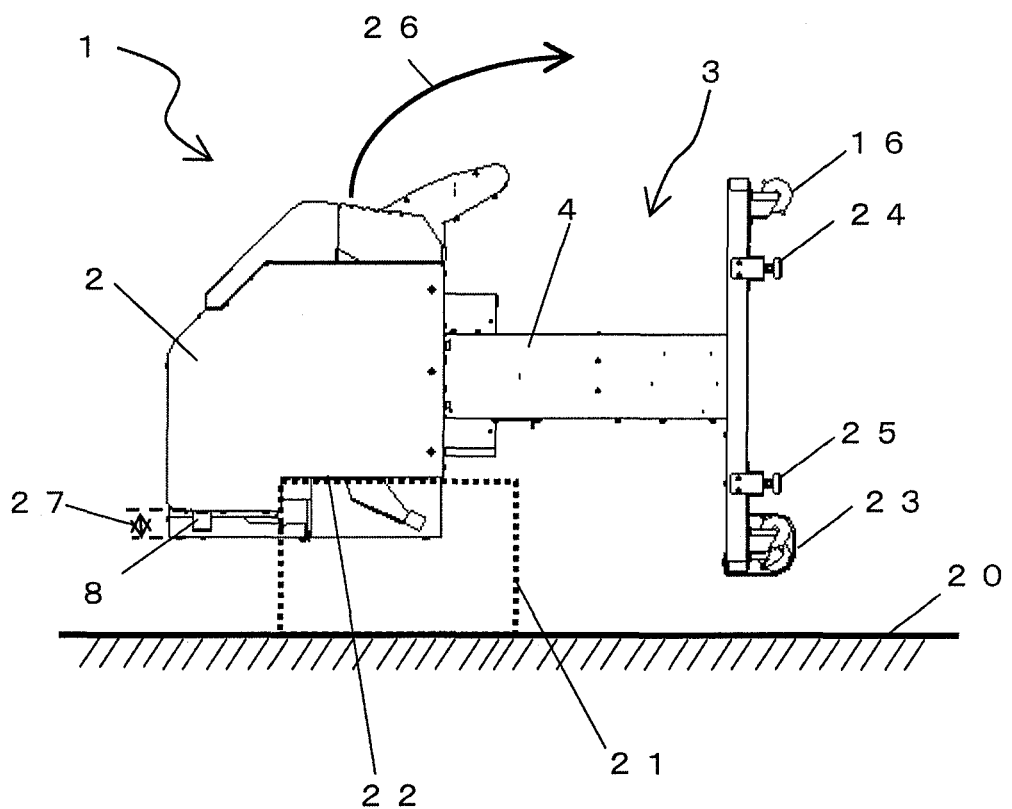
FIG. 3 is a view for illustrating an example of handling the recording apparatus.

FIG. 3 is a view for illustrating an example of handling the recording apparatus. FIG. 3 is a view for illustrating a state in which the ink jet printer 1 is laid down on the back surface of the main body section 2.

A table 21 is placed on an installation surface 20 such as a floor. The recording apparatus is laid down under a state in which a flat portion 22 of the back surface of the main body section 2 is held in contact with the table 21 indicated by the dotted line and the leg section 3 is suspended above the installation surface 20.

An arrow 27 indicates a distance from an outermost portion of the back surface of the main body section 2 to a surface to which the belt 8 is fixed. Thus, the belt 8 is fixed to a slightly-recessed portion of the back surface. A gap is formed in this manner so that a hand may be inserted in the gap when, for example, the table 21 is located under the belt 8. The gap is formed, thereby ensuring safety. Further, a length of a protruding portion of the belt 8 is smaller than the distance indicated by the arrow 27.

The caster 16 is arranged on one side of the portion extending in the front-and-back direction of the main body, which is arranged below one of the upright portions 4, and a caster with a stopper 23 is arranged on another side thereof. Further, the one of the upright portions 4 includes installation surface fixing means 24, 25. The installation surface fixing means 24, 25 are extended and contracted by turning screws. When the ink jet printer 1 is set upright, the screws are turned to bring the installation surface fixing means 24, 25 into abutment on the installation surface 20. Even with the casters 16, 17, the ink jet printer 1 is kept immovable. Further, the stopper 23 is formed of a belt covering an outer periphery of the caster. The caster is covered with the belt, thereby preventing rotation of a roller of the caster. An outer periphery of the belt is made of rubber, and preferably has slip preventing grooves formed therein.

When a user grasps the belts 8, that is, the grips 6, 7 to raise the recording apparatus in a direction indicated by an arrow 26, the caster with the stopper 23 is first brought into abutment on the installation surface 20. Even under abutment, the caster is kept immovable and remains at the abutment position. When the main body section 2 is further raised, the main body section 2 is separated from the table 21, and the caster 16 is also brought into abutment on the installation surface 20. Thus, the ink jet printer 1 is set upright. The user can firmly hold the grips 6, 7, and hence has no risk in that the recording apparatus may slip out of his/her hands. Further, owing to the stopper 23, the user can raise the recording apparatus about a fulcrum corresponding to the position at which the stopper 23 is first brought into abutment on the installation surface 20. Thus, the recording apparatus is easily set upright.

Further, even when the ink jet printer 1 is tilted in a manner of falling down to an opposite side with an excessive force at the time of setting the ink jet printer 1 upright, the user grasps the grips 6, 7, and hence can support the ink jet printer 1 while pulling the grips 6, 7.

If only a recess is formed as in the related art, the ink jet printer 1 slips out of the fingers, thereby causing a high risk in that the ink jet printer 1 may fall down. Accordingly, assistants need to support the ink jet printer 1 on right and left sides, which leads to poor operability.

Figure 4:
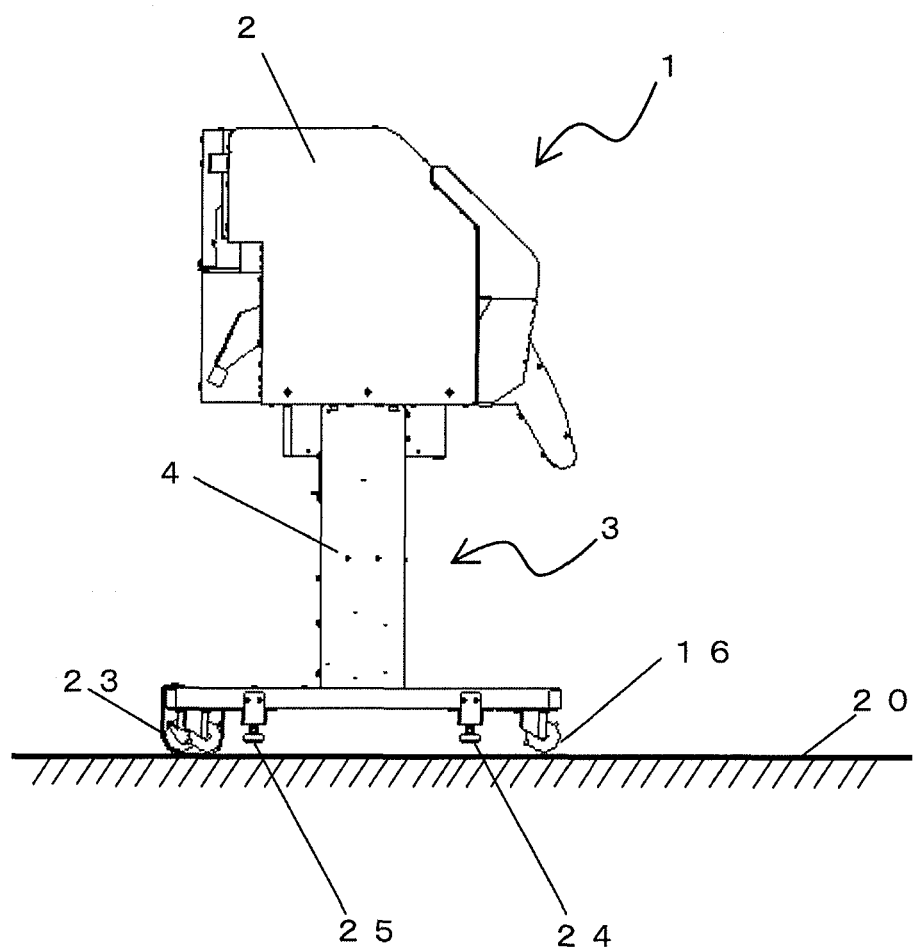
FIG. 4 is a view for illustrating an example when the recording apparatus is set upright.

FIG. 4 is a view for illustrating an example when the recording apparatus is set upright. After the recording apparatus is set upright on the installation surface 20, the stopper 23 is removed, and the ink jet printer 1 is moved. That is, the recording apparatus is set upright on the casters. Then, the screws of the installation surface fixing means 24, 25 are turned to bring the installation surface fixing means 24, 25 into abutment on the installation surface, thereby fixing the recording apparatus.

Figure 5:
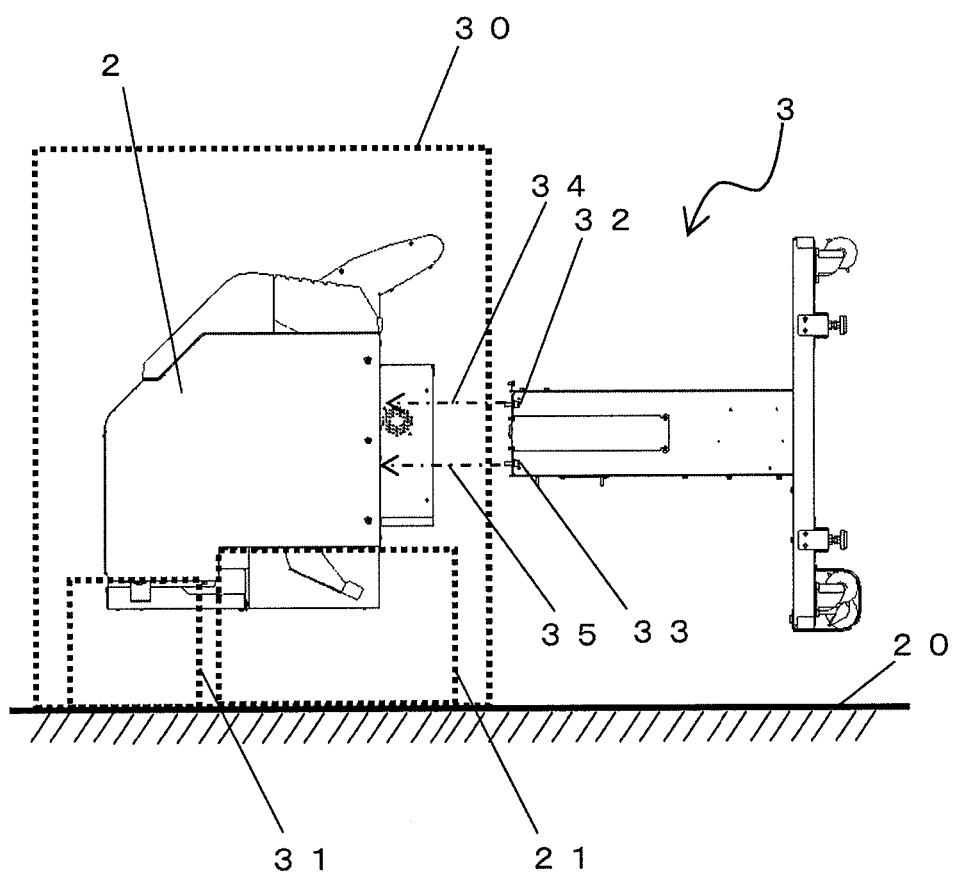
FIG. 5 is a view for illustrating an example of packing the recording apparatus.

FIG. 5 is a view for illustrating an example of packing the recording apparatus. Inside a packing box 30 indicated by the dotted line, the main body section 2 is placed and fixed on the table 21 and a table 31. Further, the leg section 3 is removably mounted to the main body section 2, and hence is packed separately from the main body section 2. Further, in a case of connecting the leg section 3, the leg section 3 is fixed to the main body section 2 with a plurality of screws 32, 33. The leg section 3 is fixed in directions indicated by dash-dot arrows 34, 35. The recording apparatus is packed so that the back surface of the main body section 2 is parallel to the installation surface 20.

A view for illustrating a state in which the leg section 3 is connected to the main body section 2 after unpacking the recording apparatus and removing the packing box 30 corresponds to FIG. 3 described above. In this case, as long as the belt 8 can be gripped, the table 31 may be arranged.

Figure 6:
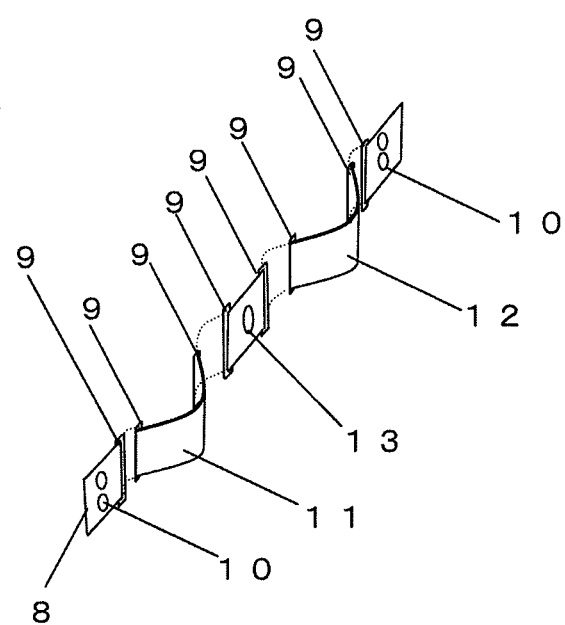
FIG. 6 is a view for illustrating a grip portion.

FIG. 6 is a view for illustrating a grip portion. The belt 8 is fixed to the metal plate of the back surface of the main body section 2 with the screws 10, 13. Further, the first gripping portion 11 and the second gripping portion 12 are ejected from the back surface, and may be grasped with the hands. The slits 9 are formed along a vertical direction defined when the ink jet printer 1 is set upright. Longitudinal directions of the slits 9 are parallel to each other. The belt 8, which has a width corresponding to lengths of the slits 9 in the longitudinal direction, is inserted through the slits 9. Thus, the belt 8 is regulated by the slits 9, thereby being capable of achieving proper transmission of a force without a twist of the belt 8.

Further, after the ink jet printer 1 is set upright, the belt 8 can be removed after removing the screws 10, 13. In this case, there is no obstacle at the time of use of the inkjet printer 1.

On both sides of each of the first gripping portion 11 and the second gripping portion 12, the belt 8 is inserted to pass through an inside of the main body section 2, and is pulled out of the main body section 2 and fixed to the main body section 2. In this manner, the belt 8 is inserted into the slits 9 at least twice. With this, a widthwise direction of the belt 8 is regulated by the slits 9, thereby preventing the twist. Even when a force is applied to the longitudinal directions of the slits 9, the belt 8 is not twisted, thereby achieving easy transmission of a force.

Figure 7:
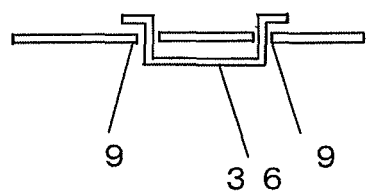
FIG. 7 is a view for illustrating another example of the grip portion.

FIG. 7 is a view for illustrating another example of the grip portion. FIG. 7 is a view for illustrating a case where a grip 36 is fitted into the slits 9. End portions of the grip are inserted into the two slits 9, respectively, and the inserted portions are bent in parallel to the metal plate of the back surface of the main body section 2. Accordingly, the grip 36 does not slip out of the slits 9. In FIG. 7, the inserted portions are bent into an L-shape, but may be bent into a T-shape. When the grip 36 is not used, the grip 36 may be pushed into the main body section 2.

Figure 8:
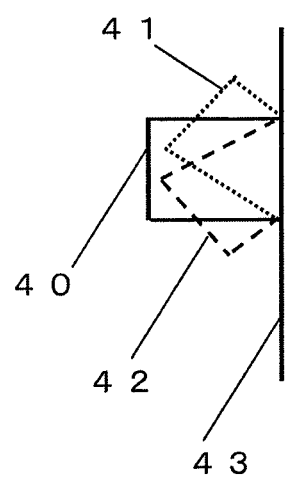
FIG. 8 is a view for illustrating an example of a movable grip portion.

FIG. 8 is a view for illustrating an example of a movable grip portion. The grip 36 protruding from a back surface portion 43 of the ink jet printer 1 can be further moved upward and downward. A first position 40 of the grip 36 corresponds to a position in a case where no force is applied to the grip 36. A second position 41 represents a case where the grip 36 is deformed when an upward force is applied to the grip 36. A third position 42 represents a case where the grip 36 is deformed when a downward force is applied to the grip 36. The grip 36 is deformed in this manner depending on the applied force. The grip 36 can be deformed as described above, and hence, for example, when the printer 1 is tilted forward from the state of being set upright on the installation surface, the grip 36 can be grasped and pulled in a direction parallel to the installation surface. In other words, it is possible to support the tilted printer 1 without changing a way of holding the grip 36. If the grip 36 is not deformed, the grip 36 remains protruding in parallel to a tilting direction of the printer 1. In this case, the way of holding the grip 36 needs to be changed in a stepped manner, which may bring a risk of unstable support. The grip 36 can be moved upward and downward, thereby easily supporting the ink jet printer 1 when the ink jet printer 1 is tilted.

INDUSTRIAL APPLICABILITY

The present invention may be used as a recording apparatus for recording an image on a recording medium.

REFERENCE SIGNS LIST

1 ink jet printer
2 main body section
3 leg section
4 upright portion
5 beam portion
6 grip
7 grip
8 belt
9 slit
10 screw
11 first gripping portion
12 second gripping portion

The invention claimed is:

1. A recording apparatus, comprising: a main body section comprising recording means for recording an image on a recording medium, a front side from which the recording medium having the image recorded thereon is ejected, a back side opposite from the front side, an upper portion and a lower portion, the back side having at least one indented section disposed adjacent to and parallel with the upper portion, the at least one indented section having a depth; and a leg section removably mounted to the lower portion of the main body section to support the main body section; wherein each of the at least one indented section of the back side of the main body section includes:

at least first to fourth slits, the second and third slits being disposed between the first and fourth slits; and a belt that is longer than a distance between the first and fourth slits and that passes through each of the first to fourth slits in alternating manner through an inside and an outside of the main body section, such that a portion of the belt that is disposed between the second and third slits protrudes to the outside of the main body section to define a grip portion, and portions of the belt that are disposed outside an area between the first and fourth stirs are exposed to the outside of the main body section and detachably attached by fastening members to a surface of the at least one indented section of the back side of the main body section, and the grip portion has a height that is variable in a direction perpendicular to the surface of the at least one indented section of the back side of the main body section so as to be gripped by a user.

2. A recording apparatus according to claim 1, wherein the plurality of slits are arranged in parallel to each other along a vertical direction when the recording apparatus is set upright.

3. A recording apparatus according to claim 1, wherein the leg section comprises a stopper for preventing slip of the leg section, and
wherein the stopper is brought into contact with an installation surface when the recording apparatus is set upright.

4. A recording apparatus according claim 1, further comprising:
a packing box in which the recording apparatus is to be accommodated; and
a table fixed to a bottom surface of the packing box, wherein a part of the back surface of the main body section is fixed to the table, and
wherein the main body section is accommodated in the packing box at a position at which the back surface and the bottom surface are opposed to each other.

5. A recording apparatus according to claim 1, wherein the grip portion is movable in a direction parallel to the back surface.

6. A recording apparatus, comprising:
a main body section comprising recording means for recording an image on a recording medium, a front side from which the recording medium having the image recorded thereon is ejected, a back side opposite from the front side, an upper portion and a lower portion, the back side having at least one indented section disposed adjacent to and parallel with the upper portion, the at least one indented section having a depth;
a leg section removably mounted to the lower portion of the main body section to support the main body section;
a plurality of slits formed in each of the at least one indented section of the back side of the main body section; and
a plurality of grips each mounted to each of the at least one indented section of the back side of the main body section and inserted into a corresponding one of the plurality of slits,
each of the plurality of grips having a height that is variable in a direction perpendicular to the back side of the main body section so as to be gripped by a user,
wherein the plurality of slits are formed in at least eight positions,
wherein at least two parts of the belt protrude outward from the back surface, and
wherein both end portions of the belt are fixed on an outer side of the back surface.

7. A method of assembling a recording apparatus, the recording apparatus comprising:
a main body section comprising recording means for recording an image on a recording medium, a front side from which the recording medium having the image recorded thereon is ejected, a back side opposite from the front side, an upper portion and a lower portion, the back side having at least one indented section disposed adjacent to and parallel with the upper portion, the at least one indented sections having a depth;
a leg section removably mounted to the lower portion of the main body section to support the main body section; wherein
each of the at least one indented section of the back side of the main body section including:
at least first to fourth slits, the second and third slits being disposed between the first and fourth slits; and
a belt that is longer than a distance between the first and fourth slits and that passes through each of the first to fourth slits in alternating manner through an inside and an outside of the main body section, such that a portion of the belt that is disposed between the second and third slits protrudes to the outside of the main body section to define a grip portion, and portions of the belt that are disposed outside an area between the first and fourth stirs are exposed to the outside of the main body section and detachably attached by fastening members to a surface of the at least one indented section of the back side of the main body section,
the grip portion has a height that is variable in a direction perpendicular to the surface of the at least one indented section of the back side of the main body section so as to be gripped by a user,
the leg section comprising a caster to be brought into contact with an installation surface when the recording apparatus is set upright, and a stopper arranged on an outer periphery of the caster,
the leg section being separated from the main body section under a state in which the recording apparatus is packed in a packing box,
the back surface of the main body section being partially placed and fixed to a table placed on a bottom surface of the packing box,
the method comprising the steps of, when assembling the recording apparatus: fixing the leg section to the main body section at a position at which the leg section is kept out of contact with the installation surface;
raising the main body section while an operator holds the grip portion to bring the stopper into abutment on the installation surface; and
further raising the main body section about a fulcrum corresponding to the stopper held in abutment on the installation surface to set the recording apparatus upright.

* * * * *